United States Patent [19]

Wicks et al.

[11] Patent Number: 5,901,223
[45] Date of Patent: May 4, 1999

[54] WIRELESS TELEPHONE WITH EXTENSION HAVING PERIPHERAL DEVICES PROVIDED THEREON

[75] Inventors: James E. Wicks, San Francisco, Calif.; Yutaka Hasegawa, Edgewater, N.J.

[73] Assignees: Sony Corporation, Tokyo, Japan; Sony Electronics, Inc., Park Ridge, N.J.

[21] Appl. No.: 08/825,865

[22] Filed: Apr. 2, 1997

[51] Int. Cl.$^6$ .................................................. H04M 1/00
[52] U.S. Cl. .......................... 379/433; 379/434; 379/420
[58] Field of Search .................................. 379/433, 428, 379/420, 434; 455/90, 575, 567

[56] References Cited

U.S. PATENT DOCUMENTS

| | | |
|---|---|---|
| D. 298,035 | 10/1988 | Watanabe . |
| D. 319,234 | 8/1991 | Konno et al. . |
| D. 326,451 | 5/1992 | Roegner . |
| D. 328,070 | 7/1992 | Seay . |
| D. 336,472 | 6/1993 | Lin . |
| D. 337,764 | 7/1993 | Paton et al. . |
| D. 352,708 | 11/1994 | Rossi . |
| D. 356,085 | 3/1995 | Fellinger . |
| D. 369,796 | 5/1996 | Grewe . |
| 5,054,051 | 10/1991 | Hoff . |
| 5,128,981 | 7/1992 | Tsukamoto et al. ..................... 455/567 |
| 5,404,390 | 4/1995 | Tamura . |
| 5,537,472 | 7/1996 | Estevez-Alcolado et al. ......... 379/433 |

FOREIGN PATENT DOCUMENTS

| | | | |
|---|---|---|---|
| 60-21636 | 2/1985 | Japan | ..................................... 379/433 |

*Primary Examiner*—Jack Chiang
*Attorney, Agent, or Firm*—Ronald P. Kananen; Rader, Fishman & Grauer

[57] ABSTRACT

A wireless telephone unit may be provided with an extension which pivots out from behind the unit or opens and closes over the face of the unit. The extension is used as a place to provide a variety of peripheral devices to supplement or enhance the functionality of the wireless telephone unit. By providing the peripheral device(s) on the extension, the compactness and portability of the wireless telephone unit is not sacrificed.

18 Claims, 8 Drawing Sheets

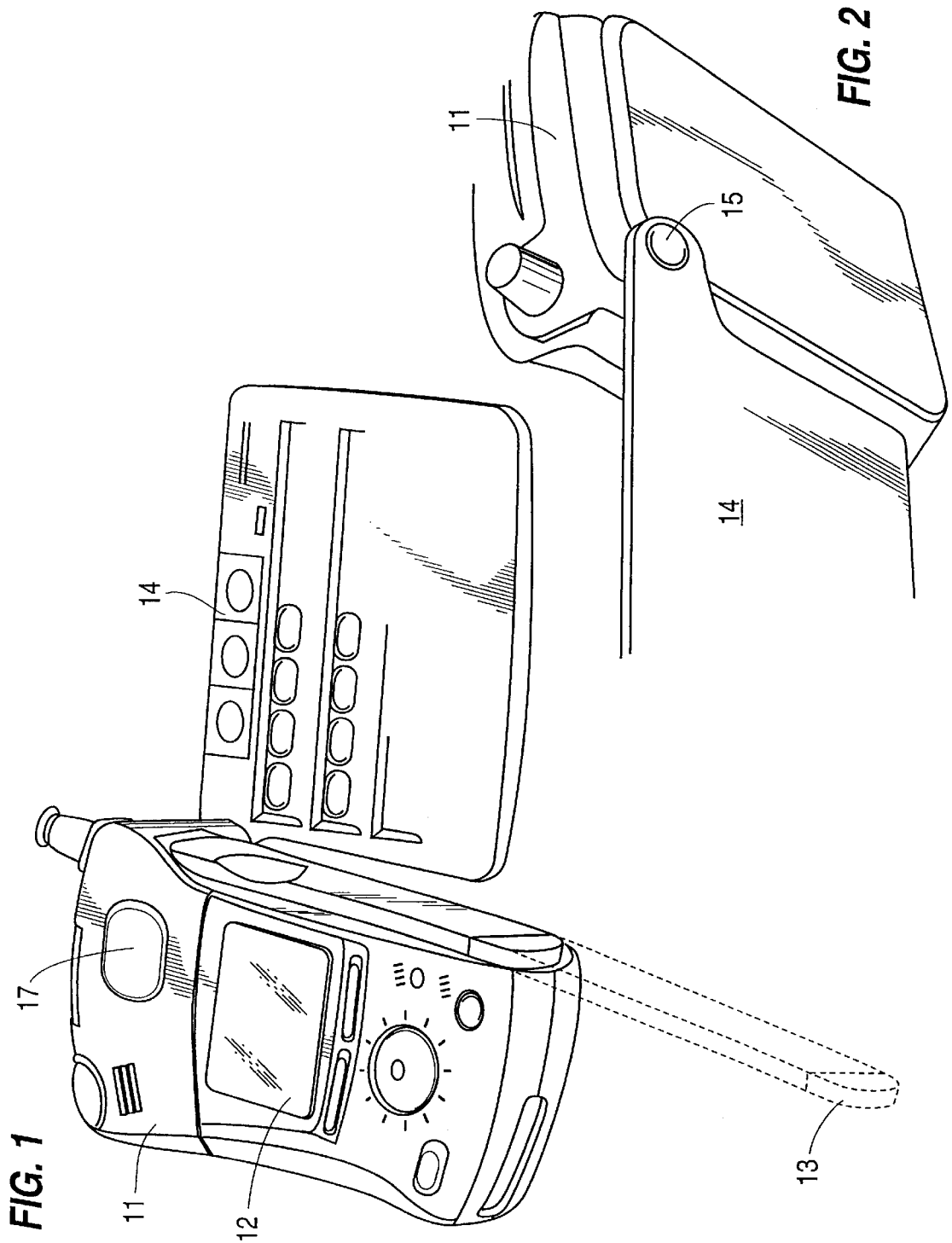

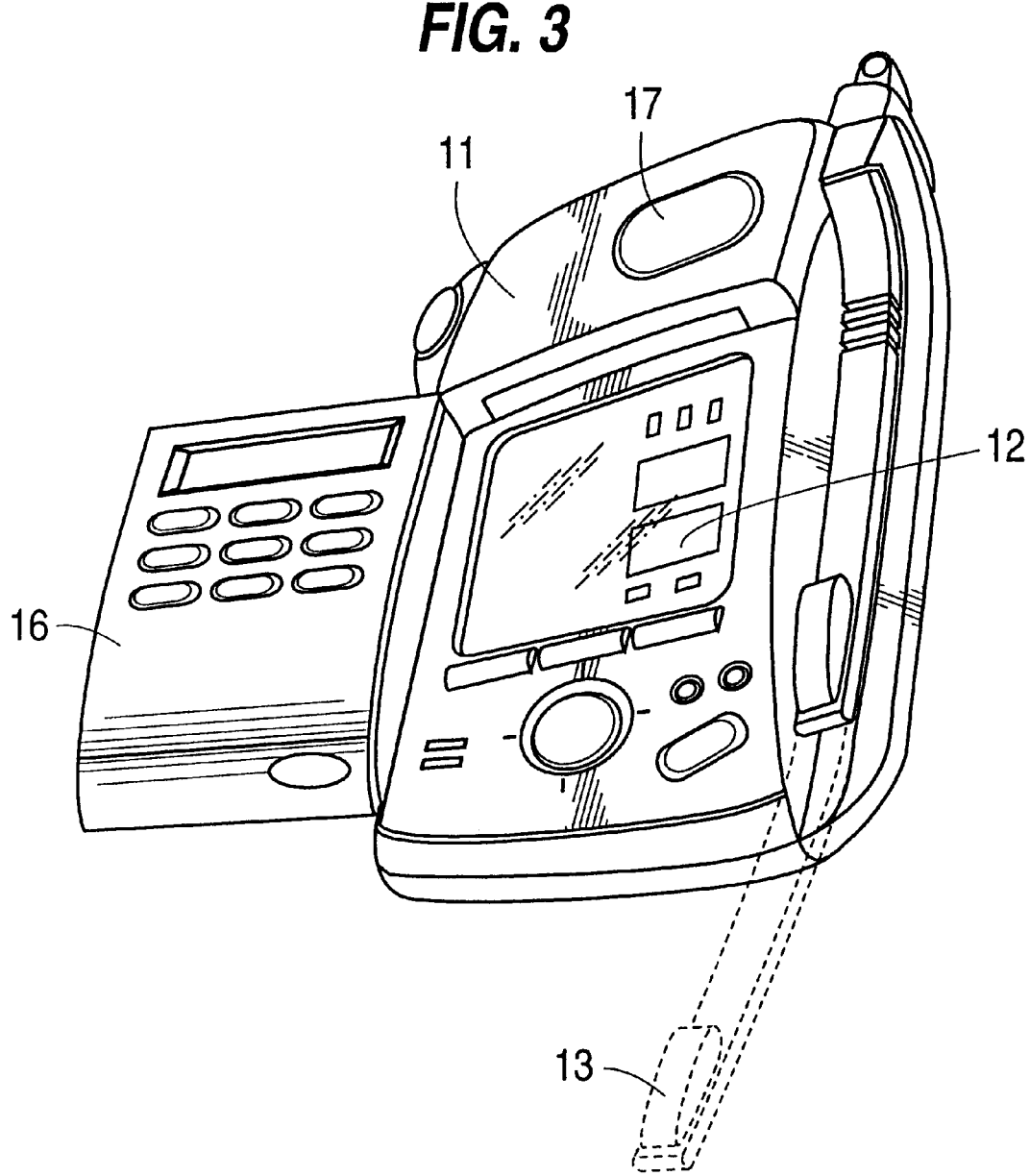

WIRELESS TELEPHONE WITH EXTENSION HAVING PERIPHERAL DEVICES PROVIDED THEREON

FIELD OF THE INVENTION

The present invention relates generally to the field of wireless telephony. Specifically, the present invention relates to a compact wireless telephone which incorporates an extension on which a variety of peripheral devices may be provided.

BACKGROUND OF THE INVENTION

Since their introduction, wireless communication systems including pagers, cellular telephones and low-tier radio telephones, have become increasingly popular. Such devices provide an extremely convenient means of communication.

Wireless communication systems, particularly cellular telephones and low-tier radio telephones, are convenient because they allow their users to communicate from almost any location in a service area. Wireless phones also save time. For example, the user of a wireless telephone unit need not waste time looking for an available telephone in order to place a call.

A wireless telephone unit also allows its user to take advantage of time spent traveling. For example, with a wireless telephone, the user can be transacting business or making appointments while driving, riding or walking.

In order to fully utilize these advantages of wireless telephones, it should be convenient for the user to have the wireless telephone unit readily available at all times. In recognition of this fact, modern wireless telephones have become increasingly smaller and lighter to facilitate being carried by the user.

Unfortunately, the goal of a compact wireless telephone unit is at odds with the trend to add functions and peripherals to the wireless telephone unit. Accordingly, there is a need in the art for a means and method of providing additional functions and peripherals on a wireless telephone unit without decreasing the compactness and portability of the unit.

OBJECTS OF THE INVENTION

Accordingly it is an object of the present invention to meet the above-described needs and others. It is an object of the present invention to provide a wireless telephone unit which has an extension on which a peripheral may be provided, but which extension does not significantly decrease the compactness or portability of the unit.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve the stated and other objects of the present invention, as embodied and described below, the invention may encompass a wireless telephone unit having: a main body; an extension attached to the main body; and a peripheral device disposed on the extension. The extension is moveable between a first extended position and a second retracted position.

In a first embodiment, the extension is rotatably attached to a rear portion of the main body and pivots in the plane of the rear portion of the main body between the first and second positions. In a second embodiment, the extension is hinged on a side of a front portion of the main body and the extension covers at least some of the front portion when in the second retracted position.

In either embodiment, the peripheral device may be: a speaker phone having, for example, a speaker, a microphone and a switch for activating the speaker phone; a digital notepad comprising a keyboard and a display connected to the keyboard; a paper notepad; a numeric keypad for dialling a telephone number to be called; or a calculator.

The present invention also encompasses a method of enhancing the functionality of a wireless telephone unit by attaching an extension having a peripheral device disposed thereon to the main body of the wireless telephone unit, where the extension is moveable between a first extended position and a second retracted position.

In a first embodiment, the method further comprises rotatably attaching the extension to a rear portion of the main body such that the extension pivots in the plane of the rear portion of the main body between the first and second positions. In a second embodiment, the method further comprises hinging the extension on a side of a front portion of the main body such that the extension covers at least some of the front portion when in the second retracted position.

In practicing either embodiment of the method of the present invention, the peripheral device disposed on the extension may be: a speaker phone having, for example, a speaker, a microphone and a switch for activating the speaker phone; a digital notepad comprising a keyboard and a display connected to the keyboard; a paper notepad; a numeric keypad for dialling a telephone number to be called; or a calculator.

BRIEF DESCRIPTION OF THE DRAWINGS

The accompanying drawings illustrate the present invention and are a part of the specification. Together with the following description, the drawings demonstrate and explain the principles of the present invention. In the drawings:

FIG. 1 illustrates a first embodiment of a wireless telephone unit of the present invention with a pivoting extension.

FIG. 2 illustrates the wireless telephone unit of FIG. 1 as viewed from the rear.

FIG. 3 illustrates a second embodiment of a wireless telephone unit of the present invention with a folding extension.

DETAILED DESCRIPTION OF THE PREFERRED EMBODIMENT

Figure 4:
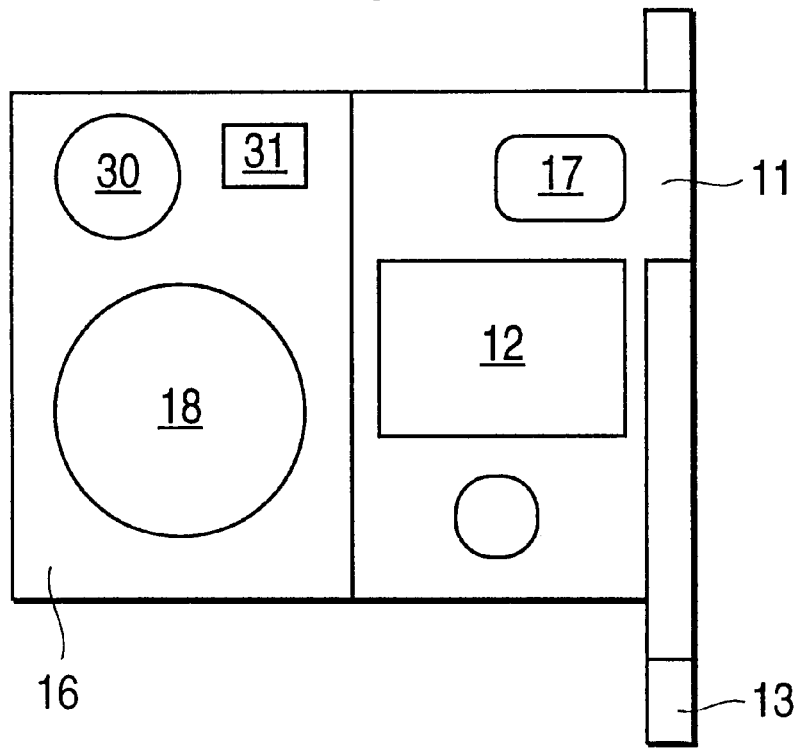
FIGS. 4 to 8 illustrate the wireless telephone unit of FIG. 2 with a variety of different peripherals disposed on the folding extension.

According to the principles of the present invention, a compact wireless telephone unit having an extension on which a variety of peripherals may be provided and which accomplishes the above described objects and others will now be described.

As shown in FIG. 1, the wireless telephone unit 11 of the present invention has a speaker 17, a display 12, e.g., a liquid crystal display, and microphone 13 disposed at the end of arm that is slidable between an extended position and a retracted position as shown in FIG. 1. The retractability of microphone 13 enhances the compactness and portability of the unit 11.

Wireless telephone unit 11 is also provided with an extension 14 which is attached to the back of the unit 11. As shown in FIG. 2, the extension 14 is attached to the unit 11 by a screw or other fastener 15 that allows the extension 14 to pivot or rotate between a retracted position behind unit 11, and an extended position at the side of unit 11. The pivoting of extension 14 is in the plane of the rear surface of the unit 11. The extended position of extension 14 is pictured in FIGS. 1 and 2.

The fastener 15 may also provide an electrical connection between the extension 14 and the unit 11. This allows electronic peripherals of the wireless telephone unit 11 to be disposed on the extension 14 and to be electrically connected to the unit 11. In this manner, a variety of peripherals to provide additional or supplemental functionalities may be provided on extension 14. Some such peripherals do not require an electric connection to the unit 11, in the which case, fastener 15 need not incorporate such a connection.

FIG. 3 illustrates a second embodiment of the present invention. The wireless telephone unit 11 of FIG. 3 is provided with much of the same structure as the unit 11 of FIGS. 1 and 2. Like features are labeled with identical reference numerals and will not be described again.

The unit 11 of FIG. 3 differs from the embodiment of FIGS. 1 and 2 in that the extension provided, extension 16, is connected to the unit 11 by a hinge (not shown) along a side of the front portion of unit 11. This allows the extension 16 to be moved between a closed position in which it covers and closes the unit 11 and an opened position as pictured in FIG. 3.

Again, the connection between extension 16 and unit 11 may or may not incorporate an electrical connection. The hinge described will incorporate an electrical connection if the peripheral provided on extension 16 is electronic and requires an electrical connection to the unit 11.

FIGS. 4 to 8 illustrate the embodiment of FIG. 3 having extension 16 on which may be disposed a variety of peripheral devices.

The peripheral disposed on extension 16 in FIG. 4 is a speaker phone. Accordingly, extension 16 includes a speaker 18 which is larger than speaker 17. Extension 16 may also include a second microphone 30 which is significantly more sensitive that the microphone 13. Speaker 18 is provided to be loud enough, and microphone 20 is provided to be sensitive enough so that they may function as a speaker phone. Switch 31 may also provided on extension 16 to switch the unit 11 between a speaker phone mode using speaker 18 and microphone 30, and a regular mode using speaker 17 and microphone 13.

Figure 5:
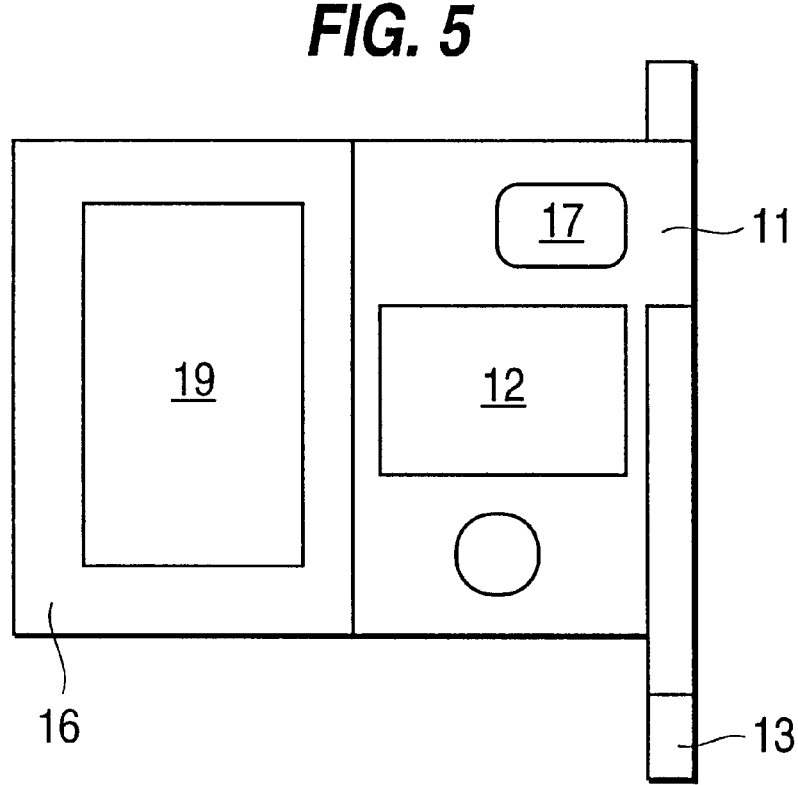

The peripheral disposed on extension 16 in FIG. 5 is a digital notepad. A small keyboard 19 is provided on extension 16. In this embodiment, an electrical connection will exist between the extension 16 and the unit 11. Using keyboard 19, the user may enter notes, memos, ideas, information, etc. The input data may be displayed on display 12 and stored in the internal memory of unit 11.

Figure 6:
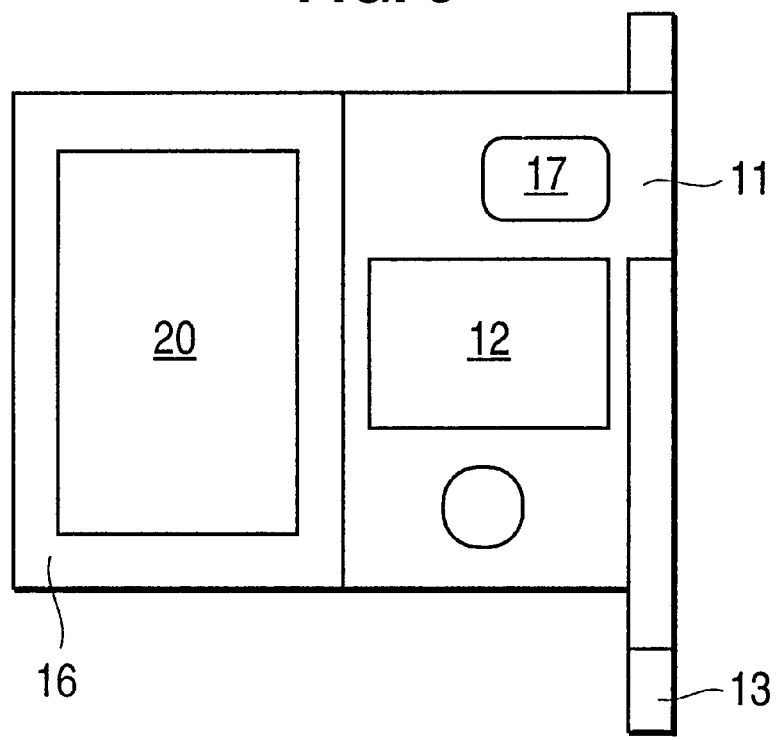

The peripheral disposed on extension 16 in FIG. 6 is a paper notepad. A pad of paper 20 may be attached on extension 16. In this embodiment, no electrical connection need exist between the extension 16 and the unit 11. Using paper 20, the user may note ideas, information, etc.

Figure 7:
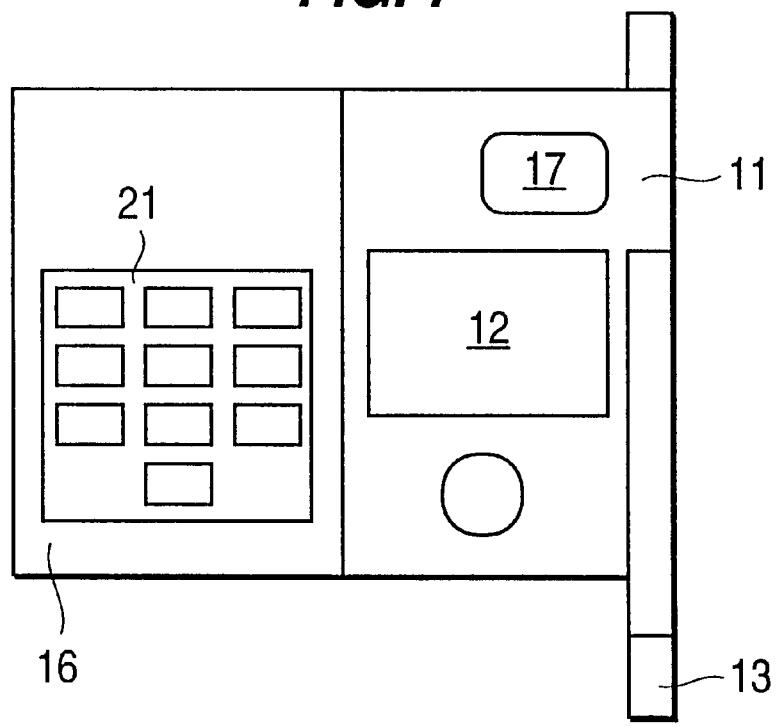

The peripheral disposed on extension 16 in FIG. 7 is a numeric keypad 21 for dialling telephone numbers to be called. As may be seen in any of the figures, in order to render unit 11 as compact as possible, a numeric keypad may not be provided on the main body of unit 11. The functionality of a numeric keypad is replaced by an alternative device. However, a particular user may still desire to have a numeric keypad, even an enlarged numeric keypad. This may be particularly true if the user is elderly or otherwise has impaired dexterity. Accordingly, using extension 16, the keypad 21 may provided and may even be over-sized without adversely affecting the compactness and portability of unit 11. In this case, an electrical connection will be provided between the keypad 21 on extension 16 and unit 11.

Figure 8:
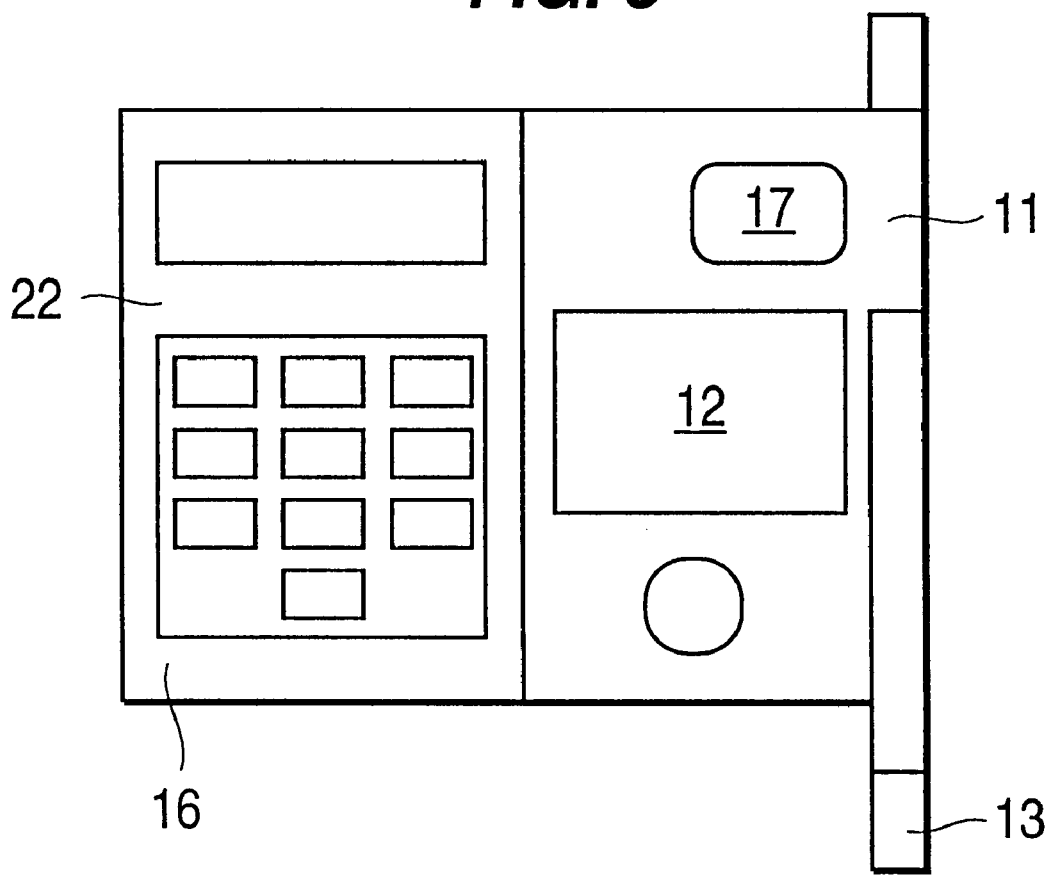

The peripheral disposed on extension 16 in FIG. 8 is a calculator 22 comprising at least a numeric keypad. The calculator 22 may also include a display as shown in FIG. 8, in which case no electric connection between the extension 16 and the unit 11 need exist. Alternatively, the calculator 22 may simply make use of display 12, omitting the additional display shown in FIG. 8. In this case an electric connection will be provided between the extension 16 and the unit 11.

FIGS. 9 to 13 illustrate the embodiment of FIGS. 1 and 2, having extension 14, on which is disposed the same variety of peripheral devices described above. Again, like reference numerals indicate like elements.

Figure 9:
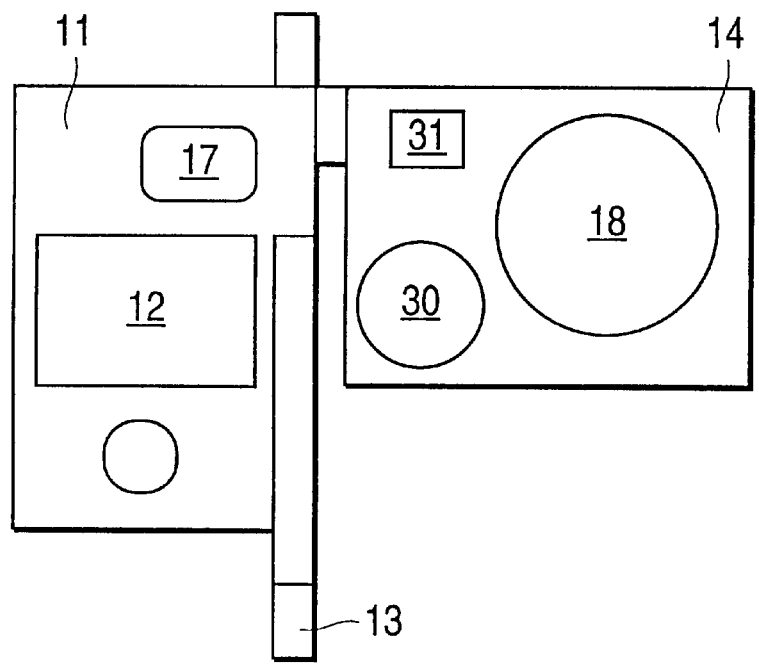
FIGS. 9 to 13 illustrate the wireless telephone unit of FIG. 1 with a variety of different peripherals disposed on the pivoting extension.

The peripheral disposed on extension 14 in FIG. 9 is a speaker phone. Accordingly, extension 14 includes a speaker 18 which is larger than speaker 17. Extension 14 may also include a second microphone 30 which is significantly more sensitive that the microphone 13. Speaker 18 is provided to be loud enough, and microphone 20 is provided to be sensitive enough so that they may function as a speaker phone. Switch 31 may also provided on extension 14 to switch the unit 11 between a speaker phone mode using speaker 18 and microphone 30, and a regular mode using speaker 17 and microphone 13.

Figure 10:
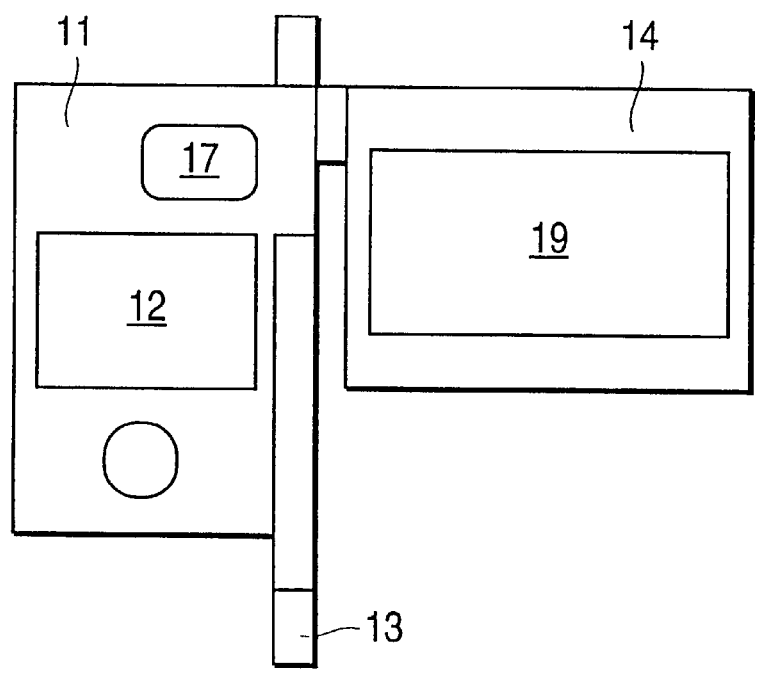

The peripheral disposed on extension 14 in FIG. 10 is a digital notepad. A small keyboard 19 is provided on extension 14. In this embodiment, an electrical connection will exist between the extension 14 and the unit 11. Using keyboard 19, the user may enter memos, ideas, information, etc. The input data may be displayed on display 12 and stored in the internal memory of unit 11.

Figure 11:
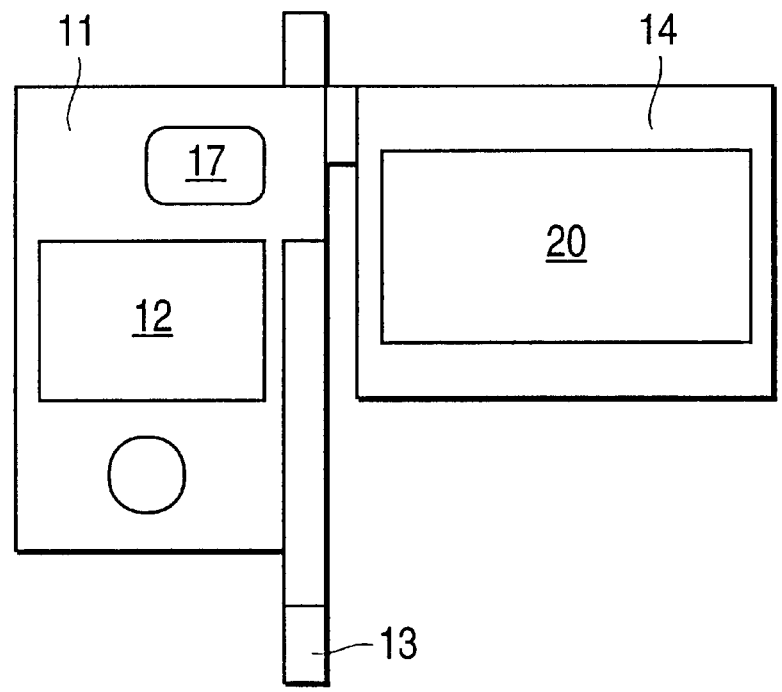

The peripheral disposed on extension 14 in FIG. 11 is a paper notepad. A pad of paper 20 may be attached on extension 14. In this embodiment, no electrical connection need exist between the extension 14 and the unit 11. Using paper 20, the user may note ideas, information, etc.

Figure 12:
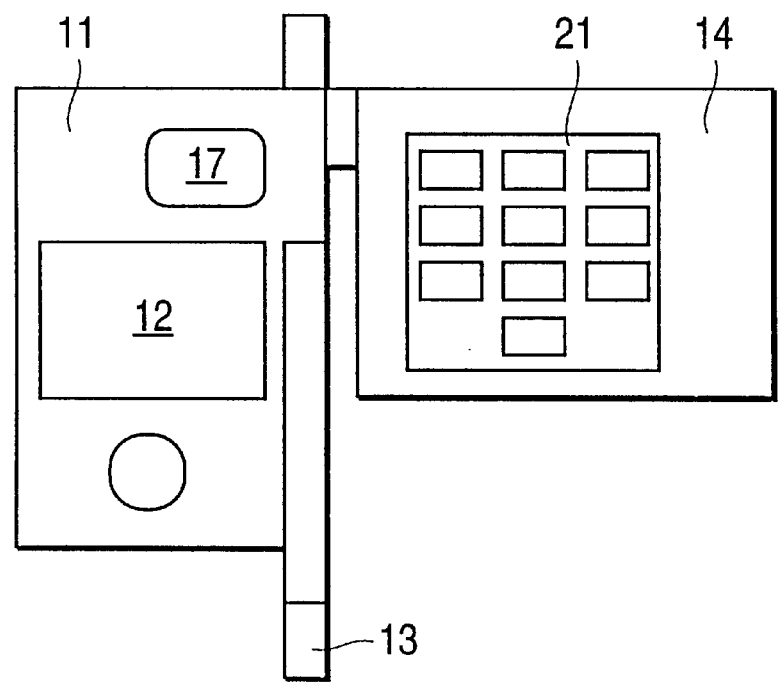

The peripheral disposed on extension 14 in FIG. 12. is a numeric keypad 21 for dialling telephone numbers to be called. As may be seen in any of the figures, in order to render unit 11 as compact as possible, a numeric keypad may not be provided on the main body of unit 11. The functionality of a numeric keypad maybe replaced by an alternative device. However, a particular user may still desire to have a numeric keypad, even an enlarged numeric keypad. This may be particularly true if the user is elderly or otherwise has impaired dexterity. Accordingly, using extension 14, a keypad 21 may provided and may even be over-sized without adversely affecting the compactness and portability of unit 11. In this case, an electrical connection will be provided between the keypad 21 on extension 14 and unit 11.

Figure 13:
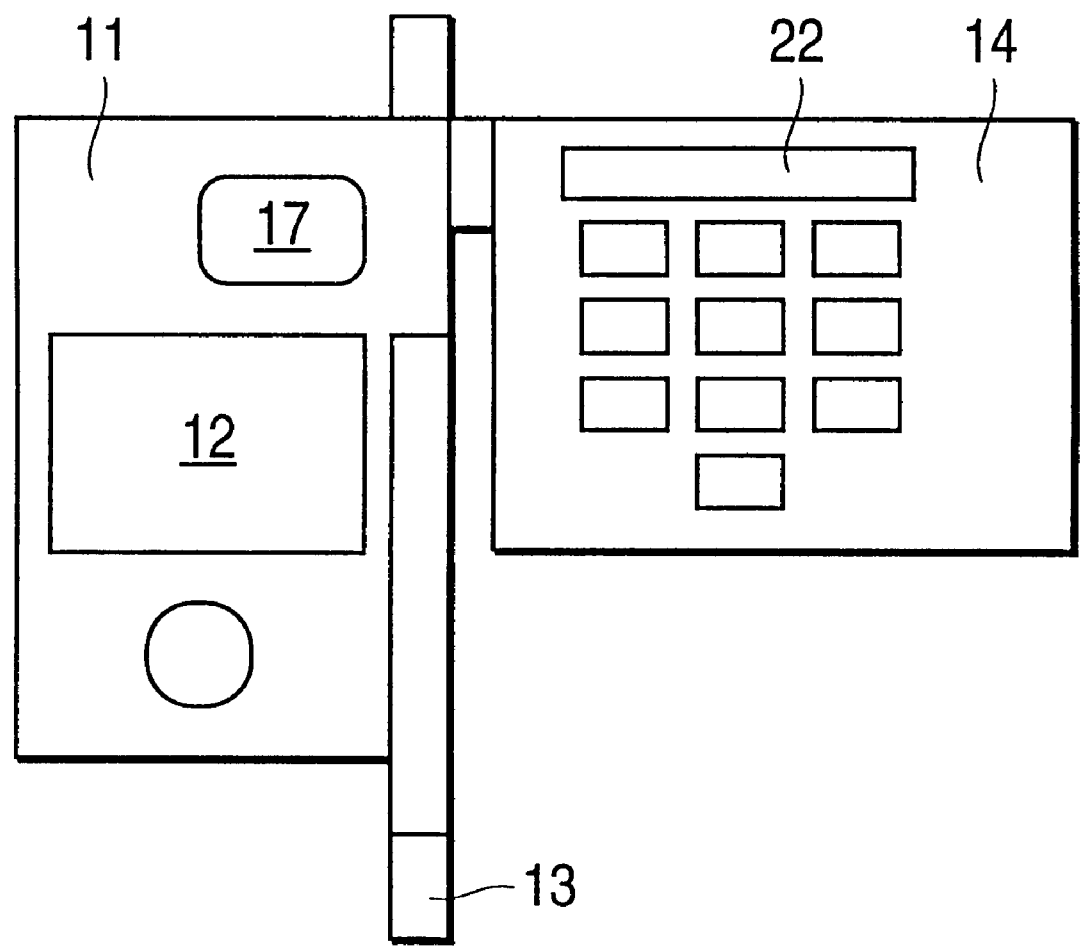

The peripheral disposed on extension 14 in FIG. 13 is a calculator 22 comprising at least a numeric keypad. The calculator 22 may also include a display as shown in FIG. 13, in which case no electric connection between the extension 14 and the unit 11 need exist. Alternatively, the calculator 22 may simply make use of display 12, omitting the additional display shown in FIG. 13. In this case, an electric connection will be provided between the extension 14 and the unit 11.

As will be appreciated by those skilled in the art many other peripheral devices may be provided on the extensions of the present invention to increase the usefulness and functionality of the wireless telephone unit 11. Additionally, within the scope of the invention and design constraints permitting, two or more of the described peripheral devices may provided on a single extension.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A wireless telephone unit comprising:
   a main body of said wireless telephone unit;
   an extension attached to said main body; and
   a speaker-phone disposed on said extension;
   wherein said extension is rotatably attached to a rear portion of said main body and pivots in the plane of said rear portion of said main body between a first extended position and a second retracted position.

2. A wireless telephone unit as claimed in claim 1, wherein said speaker phone comprises:
   a speaker;
   a microphone; and
   a switch for activating said speaker phone.

3. A method of enhancing the functionality of a wireless telephone unit comprising attaching an extension having a speaker phone disposed thereon to the main body of said wireless telephone unit wherein said extension is rotatably attached to a rear portion of said main body such that said extension pivots in the plane of said rear portion of said main body between a first extended position and a second retracted position.

4. A wireless telephone unit as claimed in claim 1, further comprising a first speaker disposed on said main body.

5. A wireless telephone unit as claimed in claim 4, wherein said speaker phone comprises a second speaker which is larger than said first speaker.

6. A wireless telephone unit as claimed in claim 1, wherein said speaker phone comprises a first microphone disposed on said extension.

7. A wireless telephone unit as claimed in claim 6, wherein said main body comprises a second microphone, wherein said first microphone is more sensitive to sound than said second microphone.

8. A wireless telephone unit as claimed in claim 1, wherein said speaker phone further comprises a button disposed on said extension for activating and deactivating a speaker and microphone of said speaker phone.

9. A method as claimed in claim 3, further comprising disposing a first speaker on said main body.

10. A method as claimed in claim 9, further comprising providing a second speaker as part of said speaker phone which is larger than said first speaker.

11. A method as claimed in claim 3, further comprising providing a first microphone disposed on said extension as part of said speaker phone.

12. A method as claimed in claim 11, wherein said providing a first microphone comprises providing, as said first microphone, a microphone which is more sensitive to sound than a second microphone provided on said main body.

13. A method as claimed in claim 3, further comprising providing, as part of said speaker phone, a button disposed on said extension for activating and deactivating a speaker and microphone of said speaker phone.

14. A wireless telephone unit comprising:
   a main body of said wireless telephone unit;
   an extension attached to said main body; and
   a speaker-phone disposed on said extension;
   wherein said extension is moveable between a first extended position and a second retracted position; and
   further wherein said speaker phone comprises a first microphone disposed on said extension.

15. A wireless telephone unit as claimed in claim 14, wherein said first microphone is more sensitive to sound than a second microphone disposed on said main body.

16. A wireless telephone unit as claimed in claim 14, wherein said speaker phone further comprises a button disposed on said extension for activating and deactivating a speaker and said first microphone of said speaker phone.

17. A wireless telephone unit as claimed in claim 14, further comprising a first speaker disposed on said main body.

18. A wireless telephone unit as claimed in claim 17, wherein said speaker phone comprises a second speaker which is larger than said first speaker.

* * * * *